United States Patent [19]

Munson et al.

[11] Patent Number: 5,715,475
[45] Date of Patent: Feb. 3, 1998

[54] TOPOLOGICAL IDENTIFICATION AND INITIALIZATION OF A SYSTEM FOR PROCESSING VIDEO INFORMATION

[75] Inventors: Bill A. Munson, Portland; Matthew A. North, Beverton, both of Oreg.

[73] Assignee: Intel Corporation, Santa Clara, Calif.

[21] Appl. No.: 366,256

[22] Filed: Dec. 29, 1994

[51] Int. Cl.[6] .................................................. G06F 13/00
[52] U.S. Cl. ............... 395/830; 395/200.38; 395/200.68; 395/284; 395/290; 395/295; 395/863
[58] Field of Search ...................... 395/828, 829, 395/830, 863, 889, 200.05, 200.06, 200.1, 200.13, 282, 284, 286, 288, 290, 295, 835–839, 882, 200.38, 200.55, 200.5, 200.62, 200.63, 200.64, 200.68

[56] References Cited

U.S. PATENT DOCUMENTS

| | | | |
|---|---|---|---|
| 5,014,267 | 5/1991 | Tompkins et al. | 395/200.04 |
| 5,161,227 | 11/1992 | Dias et al. | 395/727 |
| 5,179,670 | 1/1993 | Farmwald et al. | 395/282 |
| 5,317,693 | 5/1994 | Cuenod et al. | 395/829 |
| 5,404,460 | 4/1995 | Thomsen et al. | 395/829 |
| 5,418,909 | 5/1995 | Jackowski et al. | 395/835 |
| 5,428,748 | 6/1995 | Davidson et al. | 395/829 |
| 5,444,854 | 8/1995 | Mathis et al. | 395/839 |
| 5,467,295 | 11/1995 | Young et al. | 395/200.05 |
| 5,486,853 | 1/1996 | Baxter et al. | 348/222 |
| 5,491,805 | 2/1996 | Welmer | 395/284 |

OTHER PUBLICATIONS

Access.bus™ Technical Overview, pp. 1–16, Access.bus Industry Group, Mar. 1994.

*Primary Examiner*—Ayaz R. Sheikh
*Assistant Examiner*—Ario Etienne
*Attorney, Agent, or Firm*—Blakely, Sokoloff, Taylor & Zafman

[57] ABSTRACT

A method and apparatus for initializing and determining the topological configuration of a system for processing video information is described. The system has a master device and multiple slave devices for transmitting or receiving video information. The master and slave devices are coupled together in a daisy chain by a serial video link. The master device issues commands to the slave devices to selectively control the routing of a video data stream within each of the slave devices. The master transmits the video data onto the serial video link to the slave devices and assigns a unique address to each of the slave devices based on the responses of the slave devices to the commands and the transmitted data stream. The master device also determines the position in the daisy chain of each of the slave devices based on those responses.

41 Claims, 7 Drawing Sheets

TOPOLOGICAL IDENTIFICATION AND INITIALIZATION OF A SYSTEM FOR PROCESSING VIDEO INFORMATION

FIELD OF THE INVENTION

The present invention pertains to the field of video data communication. More particularly, the present invention relates to serial video interfaces using multiple cameras or other peripherals.

BACKGROUND OF THE INVENTION

In many computer systems, it is often desirable to couple multiple peripheral devices to a single personal computer. Similarly, in certain multi-media applications which involve video communication, it may be desirable to couple several video transmitting or receiving devices to a single controlling device. The controlling device may be a personal computer, and the transmitting or receiving devices may include one or more cameras, VCR's, scanners, video disc players, monitors, or even other computers. One situation where such a configuration is desirable is in video conferencing. For example, a user might wish to alternately switch transmission from his end of the link between one camera aimed at himself and another camera aimed at an object, such as a document. Alternatively, it may be desirable to control the routing of video data transmitted from one device to one or more receiving devices. For example, video data transmitted from a camera might be simultaneously routed to both a VCR and a monitor.

In computer or video systems which have multiple peripheral devices, the peripheral devices are sometimes coupled to a common bus for communicating information to one another. Various bus architectures are known in the prior art, and each bus architecture operates according to a protocol that defines how data is transferred between devices. One bus architecture promulgated by the Institute of Electrical and Electronic Engineers (IEEE) is defined by IEEE Standards Document P1394, entitled *High Performance Serial Bus*, Draft 7.1v1 (hereinafter "P1394 bus"). A typical P1394 bus architecture has multiple devices which are interconnected in a tree network configuration via point-to-point links. The P1394 bus, which is sometimes called "Firewire", transfers data in compressed, packet-based format. Another bus architecture is used with a communication protocol known as ACCESS.bus. ACCESS.bus is a serial communication protocol for linking multiple low-speed peripheral devices to a single port of a host computer.

In a video system having multiple cameras or other peripheral devices, it may be desirable to have a controller which can automatically determine the topological configuration of the system, such that the controlling device knows the topological location of each peripheral device with respect to the other devices in the system. This capability may be desirable in order to facilitate a user's manual selection of any particular device to function as a transmitter or a receiver. One disadvantage of existing architectures, however, is that they lack such capability. In existing architectures, the controlling device typically assigns a unique address to each peripheral device during an initialization procedure shortly after reset or power-up. A commonly used technique for assigning addresses is a form of arbitration. Alternatively, devices may be assigned addresses which depend upon data stored in a read-only memory (ROM) within each device or upon the setting of a DIP switch on the device. Thus, while each device has an address which is unique, the addresses have no relationship to the device's location within the system in existing architectures.

Another disadvantage of some existing architectures, is that they are not capable of transmitting "raw" video data, e.g., uncompressed video data transmitted at data rates on the order of 240 Mbits/sec. For example, ACCESS.bus transmits data at a maximum rate of approximately 100 kbits/sec in the standard mode. While P1394 (Firewire) may be capable of higher data rates, it uses packet-based data; it is not configured for stream-based video data. In addition, some existing bus architectures require multiple connectors on the controlling device to accommodate multiple cameras or other peripheral devices. Alternatively, the user may be required to set jumpers or switches on the peripheral devices in order to use multiple peripheral devices.

Hence, it is desirable to provide a method of initializing and determining the topological configuration of a video system having multiple peripheral devices. It is also desirable to provide for such a method in a video system which can accommodate high-speed, uncompressed, serial video data, without the use of jumpers or switches.

SUMMARY OF THE INVENTION

A method and apparatus for initializing and determining the topological configuration of a system for processing video information is described. The system has a master device and a plurality of slave devices for transmitting or receiving video information coupled together in a daisy chain by a serial video link. The master device is used to issue commands to the slave devices to selectively control the routing of a video data stream within the slave devices. The video data stream is transmitted onto the serial video link to the slave devices using the master device. A unique address is assigned to each of the slave devices based on the responses of the slave devices to the commands and the transmitted data stream. In addition, the position in the daisy chain of each of the slave devices is determined based on the responses of the slave devices to the commands and the transmitted data stream.

Other features of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for topological identification and initialization of a system for processing video information is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

SYSTEM ARCHITECTURE

Figure 1:
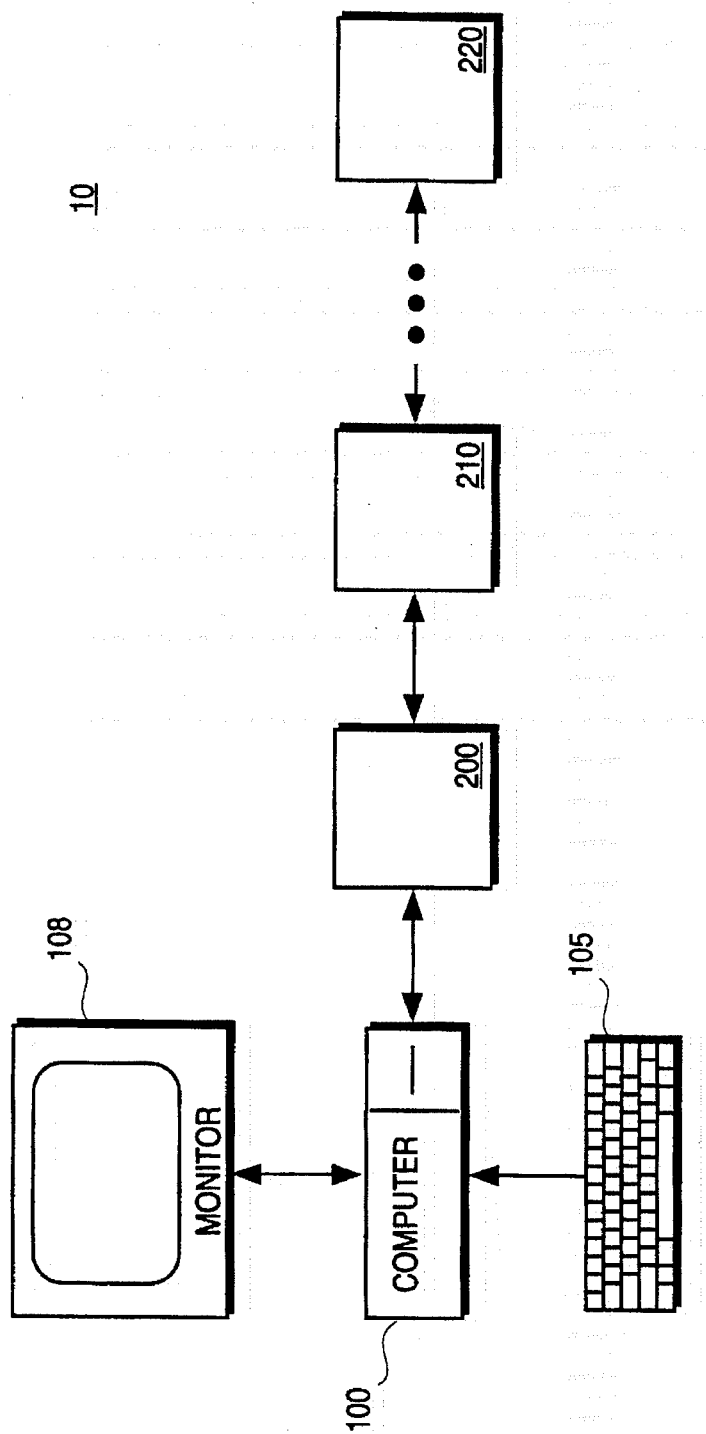
FIG. 1 is a block diagram of a system for processing video data comprising a computer and multiple devices for transmitting or receiving video data.

FIG. 1 shows an embodiment 10 of a system for processing video information in which the present invention may be practiced. The system comprises a computer 100 which controls the system operation. Coupled to the computer 100 are a keyboard 105, a monitor 108, and peripheral devices 200, 210 and 220. The peripheral devices 200, 210 and 220 are video devices for transmitting or receiving video data which may be cameras, VCRs, scanners, video disc players, monitors, other computers, or various other types of video devices. Each of the peripheral devices 200, 210 and 220 is coupled to the computer 100 in a daisy chain configuration. The actual number of peripheral devices in the daisy chain may be varied to accommodate the user's needs.

Figure 2:
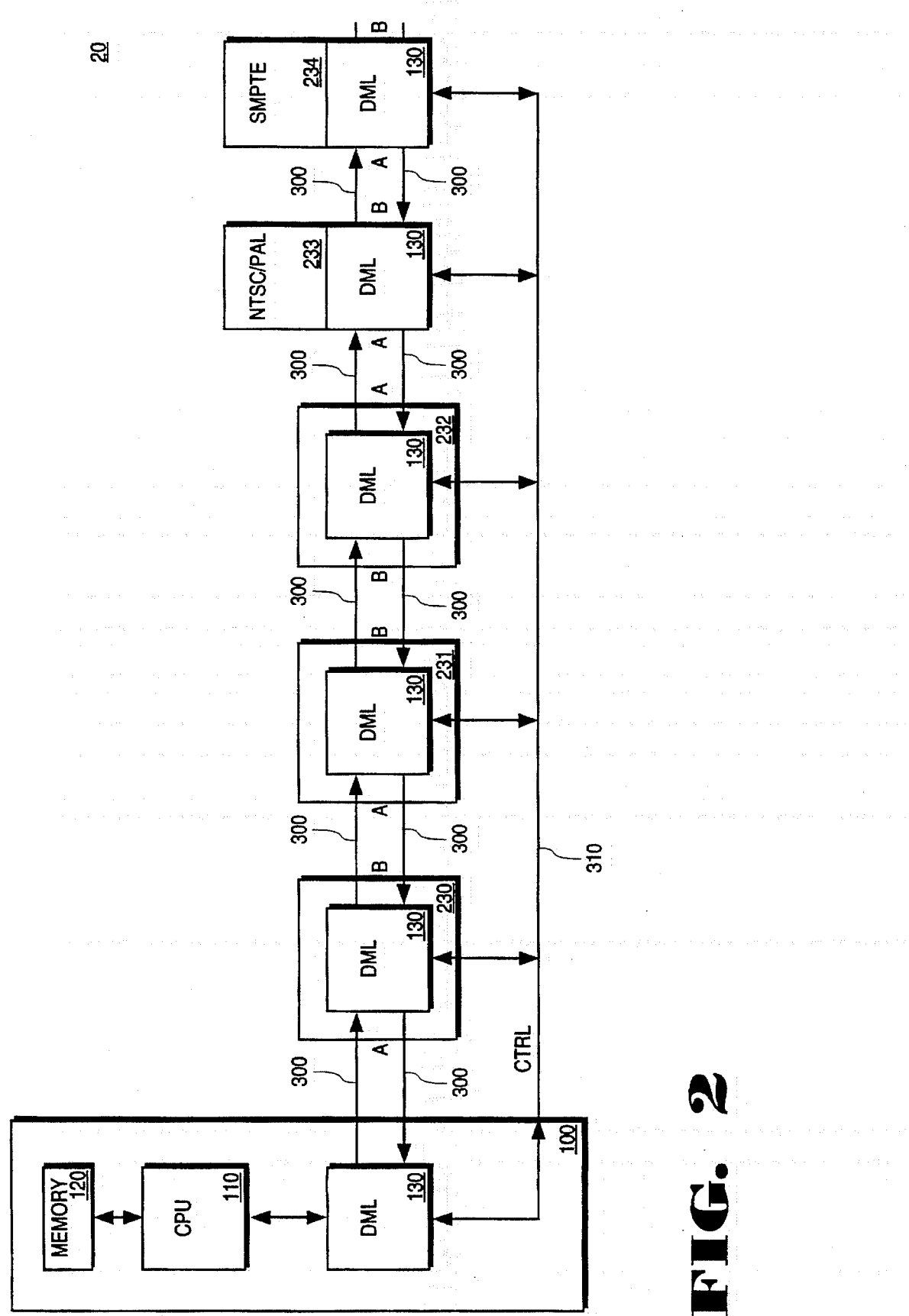
FIG. 2 illustrates a block diagram of a system for processing video data configured in accordance with the currently preferred embodiment.

FIG. 2 shows another embodiment 20 in which the present invention may be practiced. The computer 100 comprises a central processing unit (CPU) 110, a memory 120 coupled to the CPU 110, and a digital media link (DML) 130 coupled to the CPU 110. As in embodiment 10, the video devices 230–234 may be cameras, VCR's, scanner's, video disc players, monitors, other computers, or various other types of video devices. Each of video devices 230–232 comprises a DML 130 which is an integral unit within the video device and which is essentially identical to the DML 130 in the computer 100. Video devices 233 and 234 are not constructed with integral DMLs 130. Instead, the DMLs 130 which are interfaced with devices 233 and 234 are disconnectable adapters rather than being integral components within the video devices 230–234. Video device 233 is a video device using an analog video format, such as National Television System Committee (NTSC) format or Phase Alternating Line (PAL) format. Video device 234 is a device using digital format, such as Society of Motion Picture and Television Engineers (SMPTE) format. The DML 130 within the computer 100 may be considered a master DML. The DMLs 130 within each of the video devices 230–234 respond to commands issued from the computer DML 130 and may therefore be considered slave DMLs. Each of video devices 230–234 is constructed such that its DML 130 is an integral unit within that video device.

Figure 3:
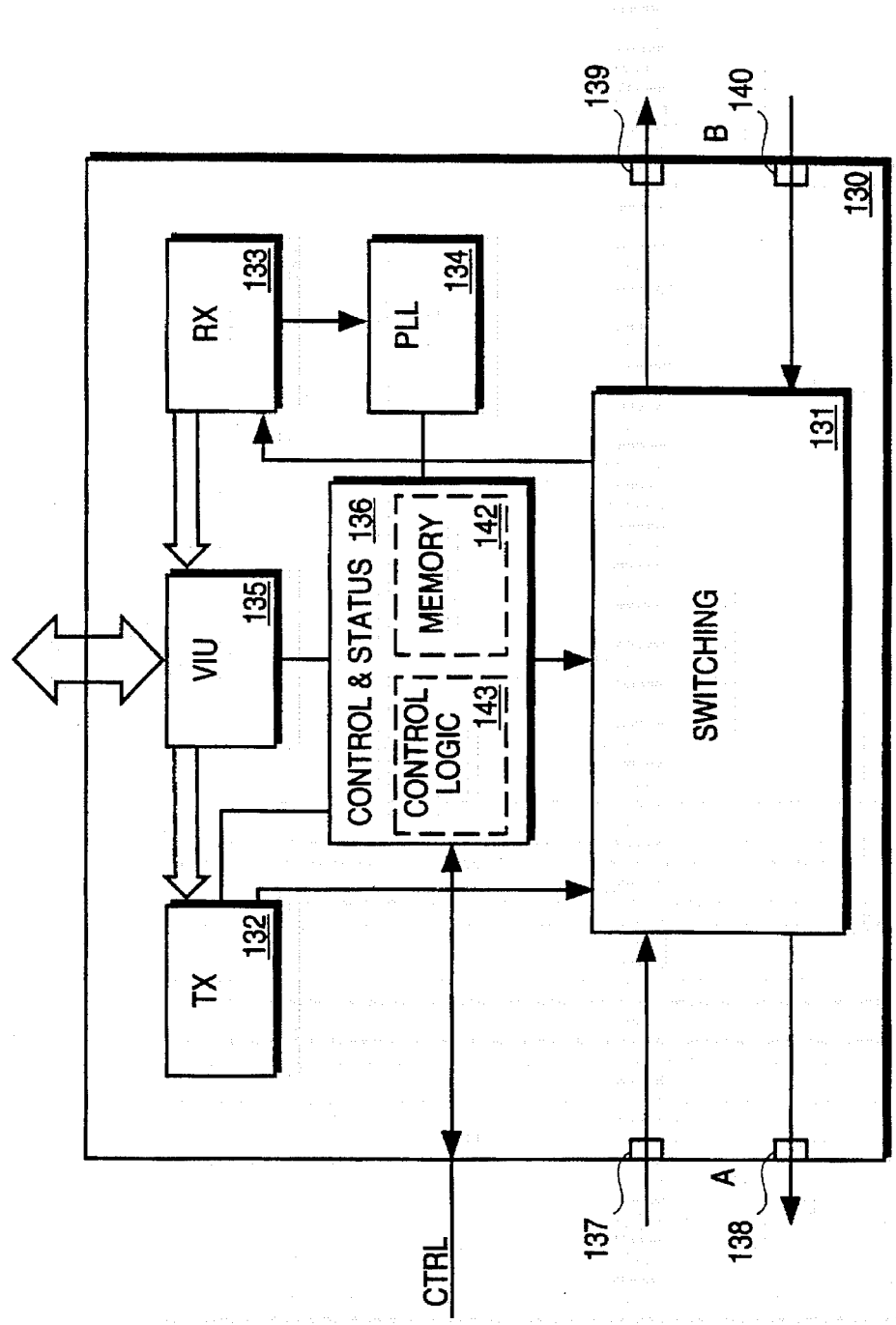
FIG. 3 shows a block diagram of a digital media link (DML) according to the currently preferred embodiment.

The DML 130 of each of the video devices 230–234 is coupled to the computer's DML 130 in a daisy chain configuration via a high speed video data link. The data link 300 carries serial video data with embedded clock information. Each DML 130 has two full_duplex high speed serial channels, designated channel A and channel B, for coupling the DML 130 to the data link. Each of channels A and B consist of two differential pairs, one pair for transmitting high speed video data and one pair for receiving high speed video data. In addition, the DML 130 of each of the video devices 230–234 is also coupled to the DML 130 of the computer 100 and to the DML of each other video device via an independent control channel CTRL. The control channel CTRL is a serial communication channel that is interfaced to each DML 130 by means of a control and status unit 136. The control channel CTRL is a serial communication channel which may be implemented in a bus having an architecture compatible with Access.bus or a similar architecture. The control and status unit 136, which is shown in FIG. 3 and is discussed further below, may be either internal to the DML 130 or externally coupled to the DML 130. In the embodiment 20 of the system, the control and status unit 136 is internal to the DML 130, as illustrated in FIG. 3.

Each of the DMLs 130 is designed to be symmetrical, as will be discussed further below. For purposes of this description, the video device 230 which is closest to the computer 100 in the daisy chain, will be referred to as the most senior video device in the daisy chain. All other video devices are more junior to the most senior video device 230. Accordingly, for any given video device 230–234 in the daisy chain, video devices which are farther from the computer 100 than that video device are considered to be more junior in the daisy chain with respect to that video device, whereas video devices which are closer to the computer 100 than that video device are considered to be more senior in the daisy chain with respect to that video device. Each of the DMLs 130 is symmetric in that, for any given DML 130, it makes no difference whether channel A or channel B is coupled to the more senior side of the daisy chain. This feature is illustrated in FIG. 2, in which the DMLs 130 of video devices 230–234 are coupled such that channels A of each of these video devices faces the more senior side of the daisy chain while channel B of these video devices face the more junior side of the daisy chain. In contrast, the DML 130 of device 232 is coupled to have channel B facing the more senior side of the daisy chain and channel A facing the more junior side of the daisy chain. Note that the coupling of video device 232 in this manner is intended only for the purpose of illustrating the symmetry of the DMLs 130 and is not essential to practicing the present invention.

The internal construction of each of the DMLs 130 is shown in greater detail in FIG. 3. The DML 130 comprises a switching network 131, a transmitter 132, a receiver 133, a phase locked loop (PLL) 134, a video interface unit (VIU) 135 and a control and status unit 136. The switching circuit receives as input video data received on channel A through receive port A 137 and video data on channel B through receive port B 140. The switching network 131 transmits video data onto channel A through transmit port A 138 and transmits video data onto channel B through transmit port B 139. The switching network 131 comprises multiplexors and other circuitry for controlling the routing of data within the DML 130 and the details of which are not relevant for purposes of this description. The control and status unit 136 comprises a memory 142 for storing addresses and control logic 143. Each control and status unit 136 is coupled to the control and status unit 136 of the other DMLs 130 via the control channel CTRL.

For a DML 130 associated with a device 230–234 configured to transmit video data, such as a camera or a VCR in playback mode, the VIU 135 receives parallel video data from other circuitry within the video device 230–234, inserts synchronization data, and outputs the parallel video data to the transmitter 132. The transmitter 132 converts parallel video data received from the VIU 135 to serial format and routes it to the switching circuitry. Commands issued to the DML 130 from the computer DML 130 via the control channel CTRL are used to control the switching circuitry, such that the serial video data can be selectively routed to either or both of transmit port A 138 and transmit port B 139.

When the video device 230–234 is configured to receive video data, as with a monitor or a VCR in record mode, commands received via the control channel CTRL are used to control the switching circuitry, such that serial data received at receive port A 137 may be routed to either the receiver 133 or to either of transmit ports A or B, or to none of these destinations. Similarly, data which is received at receive port B 140 may be routed to either or both of transmit ports A or B or to the receiver 133. When video data received at either receive port A 137 or receive port B 140 is routed to the receiver 133, the PLL 134 will lock on to the serial video data stream. When the PLL 134 locks onto data stream, a status register within the control and status unit 136 is set to 1. Accordingly, whether a DML 130 has locked onto a video data stream can be determined by the computer DML 130 by reading the status register via the control channel CTRL. The VIU 135 receives parallel video data from the receiver 133, decodes synchronization information, and transmits parallel video data to other circuitry within the device 230–234.

INITIALIZATION AND TOPOLOGICAL IDENTIFICATION

Figure 4A:
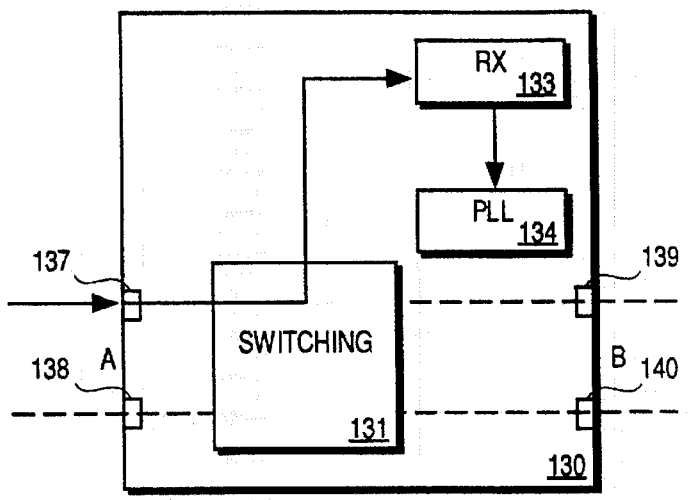
FIGS. 4A through 4E illustrate acceptable data paths within a digital media link (DML) during initialization according to the currently preferred embodiment.
Figure 4B:
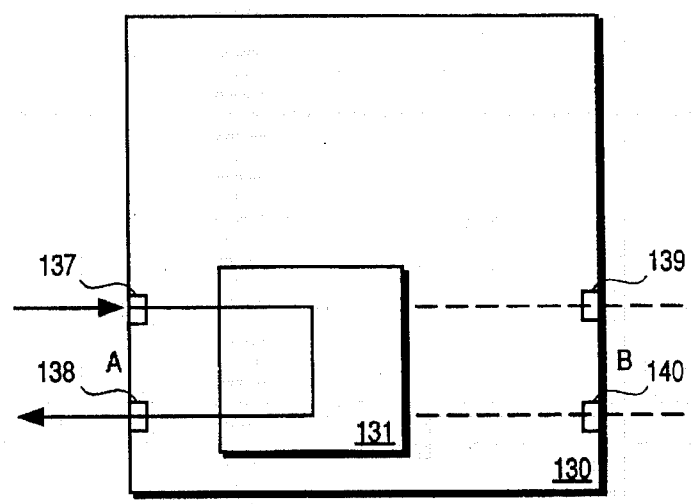
Figure 4C:
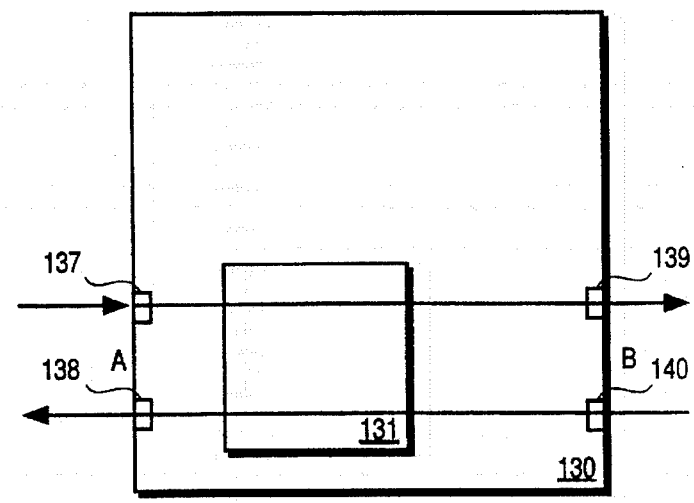
Figure 4D:
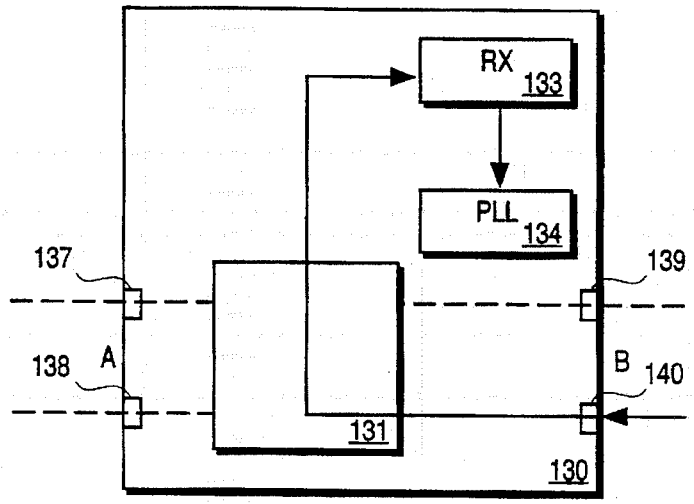
Figure 4E:
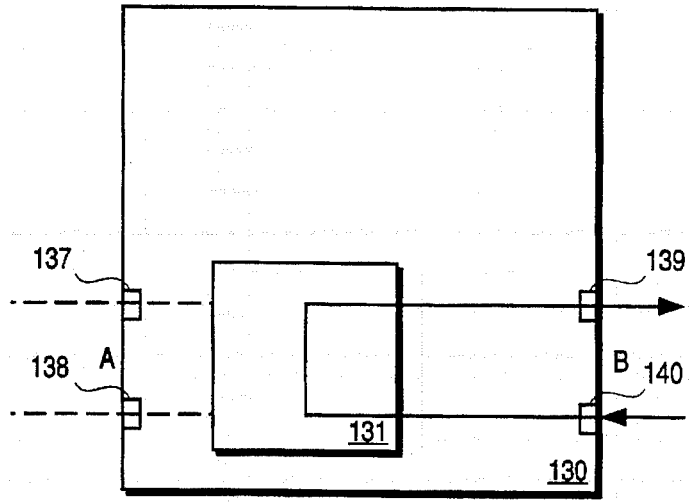

During the initialization of the system, each of the DMLs 130 has five nominal modes of data routing, which are shown in FIGS. 4A through 4E. The mode of each DML 130 at any given time is determined by the computer 100 using commands issued from the computer DML 130 via the control channel CTRL. The commands control the routing of data through the switching network 131 of each of the DMLs 130. The first mode is designated RECEIVE_A mode and is depicted in FIG. 4A. In RECEIVE_A mode, video data received through receive port A 137 is routed to the receiver 133 and then to the PLL 134, where it is locked onto. However, the data received through receive port A 137 is not routed to either transmit port A 138 or transmit port B 139. The second mode is designated VERIFY mode and is depicted in FIG. 4B. In VERIFY mode, video data received through receive port A 137 is routed through the switching network 131 to transmit port A 138, where it is retransmitted onto the data link 300 back toward the computer 100. The video data received through receive port A 137 is not routed to transmit port B 139. The third mode is designated BYPASS mode and is depicted in FIG. 4C. In BYPASS mode, video data which is received through receive port A 137 is passed through the switching network 131 to transmit port B 139, where it is transmitted onto the video link 300; video data received through receive port B 140 is passed through the switching network 131 to transmit port A 138, where it is transmitted onto the video link 300. The other two modes, depicted in FIGS. 4D and 4E, are essentially the mirror images of those depicted in FIGS. 4A and 4B. The modes depicted in FIGS. 4D and 4E represent the case where a DML 130 has its channel B side coupled to the more senior side of the data link. Accordingly, the mode depicted in FIG. 4D is designated RECEIVE_B mode.

Figure 5:
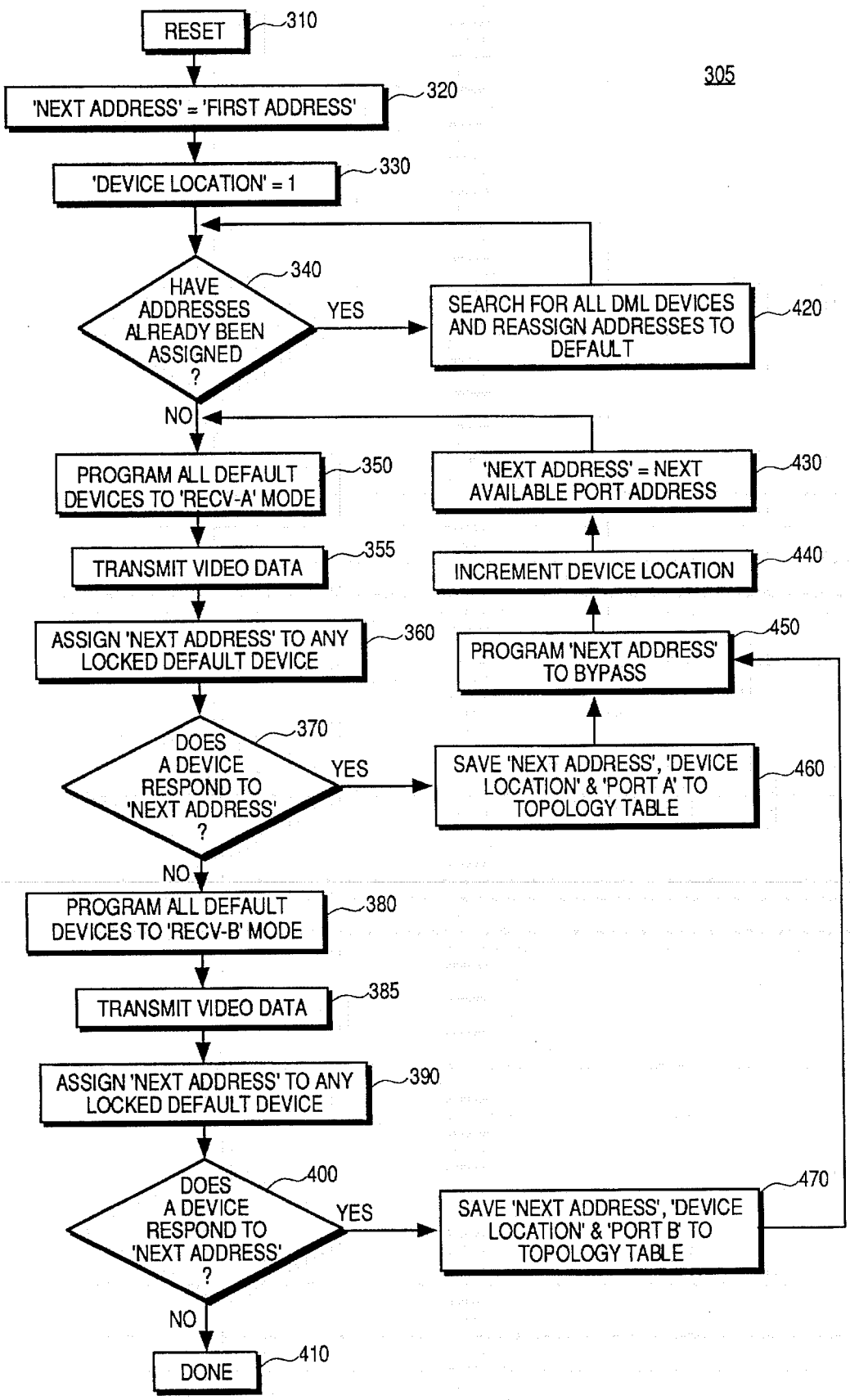
FIG. 5 shows a block diagram of a method of initializing and determining the topological configuration of a system for processing video data.

Referring now to FIG. 5, initialization and identification of the system topology are performed in a single process 305, as will now be described in detail. In step 310, the process 305 is initiated by resetting the system. The reset function may occur in response to a user's manually resetting the system, or it may occur automatically, depending upon the designer's chosen implementation. In step 320, Next Address is a variable which represents the next address to be assigned to one of the video devices 230–234. First Address is the first available address value for Next Address. The values of Next Address and First Address are determined by software within the computer CPU 110. Similarly, in step 330, Device Location is a variable which is set by software within the computer CPU 110.

Once the system is reset in step 310, Next Address is initialized to the value First Address, and Device Location is initialized to 1, as shown in steps 320 and 330, respectively. Next, each of the video devices 230–234 is assigned the same predetermined default address. This step may be subdivided into steps 340 and 420. In step 340 a determination is made whether addresses have already been assigned to the video devices 230–234. If addresses have been assigned, then each of the video devices 230–234 is reassigned to the same predetermined default address in step 420. If a unique address has not already been assigned to each device 230–234, then each device 230–234 has the default address.

In step 350, each of the video devices which has the default address (which initially is all video devices 230–234) is programmed to the RECEIVE_A mode, as depicted in FIG. 4A. In step 355, the computer 100 transmits via its DML 130 a serial video data stream onto the video data link. Because each of the video devices 230–234 is set to the RECEIVE_A mode, no more than one of the video devices 230–234 can receive and lock onto the video data stream. Specifically, only the most senior video device 230 on the daisy chain can lock onto the data stream. If channel A of the most senior video device 230 is coupled to the computer side of the daisy chain, then the PLL 134 of that video device 230 will receive and lock onto the video data stream. When the PLL 134 locks onto the data stream, the status register within the control and status unit 136 will be set to one. Conversely, if channel B of the most senior video device 230 is coupled to the computer side of the daisy chain, then that video device 230 will not receive and lock onto the data stream.

In step 360, the computer DML 130 issues a command via the control channel CTRL to cause any DML 130 which has received and locked onto the data stream to be assigned the address represented by Next Address. Accordingly, the first time step 360 is performed, the video device which has locked onto the data stream (the most senior video device 230) is assigned the address First Address. When a video device 230–234 is assigned an address, as in steps 360 and 390, the address is stored within that video device 230–234 in the memory 142 which is internal to (or coupled to) the DML 130. The address is transmitted from the computer DML 130 to the video device DML 130 via control channel CTRL.

In step 370, a determination is made whether one of the video devices 230–234 has in fact been assigned the unique address Next Address. Step 370 is performed by first causing any video device 230–234 which has been assigned the unique address represented by Next Address to receive video data transmitted from the computer DML 130 through receive port A 137 and to redirect that video data back onto the data link toward the computer 100 through transmit port A 138. Hence, the video device 230–234 having address Next Address is set to the VERIFY mode shown in FIG. 4B. Next, the computer DML 130 transmits a video data stream onto the data link. If the computer DML 130 then receives in return that same video data stream, the determination is made that a video device 230–234 has in fact been assigned the address Next Address. If the computer 100 does not receive the video data stream which it had transmitted onto the daisy chain, then a video device 230–234 has not been assigned the address Next Address. The latter case will result if either: 1) the next DML 130 to be assigned an address has its channel B coupled to the more senior side of the daisy chain, or 2) there are no more DMLs 130 to be assigned addresses.

The steps of assigning a unique address to a DML 130 and determining whether a DML 130 has been assigned that unique address can be performed using various alternative methods. A first alternative method of performing these steps is to use two addresses in conjunction with one command. This method is depicted in the flow chart of FIG. 5. Specifically, a first address, Default (No Lock), is used to assign the unique address, while a second address, Default (Lock), is used to determine whether the address has actually been assigned. Hence, the step of assigning unique address uses the command/address instruction, "If Address=Default (No Lock), then set RECEIVE_A." The step of determining whether that unique address has actually been assigned then uses the instruction, "If Address=Default (Lock), then set Next Address." A second alternative method of performing the steps is to use two different commands. Specifically, the first command would effectively state, "If Address=Default, then set RECEIVE_A." The second command would effectively state, "If Address=Default, then set Next Address if locked."

When an address is assigned to one of the video devices 230-234, the memory within that video device 230-234 then stores that address. When the computer DML 130 then verifies that the address has actually been assigned, according to step 370, that address is then saved to a topology table in a memory 120 within the computer 100 along with Device Location (which is 1 during the first iteration) and a designation "Port A" (since the video device has received data through receive port A 137). If a video device has not responded to Next Address in step 370 (e.g., has not been assigned the address Next Address), then in step 380 all video devices 230-234 having the default address are reprogrammed to enter the RECEIVE_B mode, as depicted in FIG. 4D.

Once all video devices having the default address are programmed to the RECEIVED_B mode in step 380, video data is again transmitted by the computer DML 130 onto the data link in step 385 in the same manner as in step 355. Next, in step 390, a command is issued by the computer DML 130 via the control channel CTRL to cause any video device which has received and locked onto the data stream to be assigned the address Next Address, as was the case in step 360. In step 400, a determination is again made as to whether or not a video device has been assigned Next Address. This is performed in essentially the same manner as described in step 370, except that the VERIFY mode of FIG. 4E is used, rather than that of FIG. 4B. If a video device has not been assigned Next Address, then there are no more video devices in the daisy chain remaining to be assigned addresses, and the process ends (step 410). If a video device 230-234 has been assigned Next Address, that address is saved to the topology table in the computer memory 120 along with Device Location and the designation "Port B" in the same manner as was described above in step 460.

After a video device's address, location, and corresponding port are saved to memory 120 (step 460 or 470), then that video device is programmed to enter the BYPASS mode as shown in FIG. 4C. Next, in step 440, Device Location is incremented, and in step 430 Next Address is set to the next available address. From step 430 the process loops back to step 350.

Hence, by successively controlling the routing of data within each of the DMLs 130, a unique address can be assigned to each DML 130 such that the physical location within the daisy chain of each video device 230-234 is known and stored in memory. This identification process is performed without any interaction or input from the user after reset.

Figure 6A:
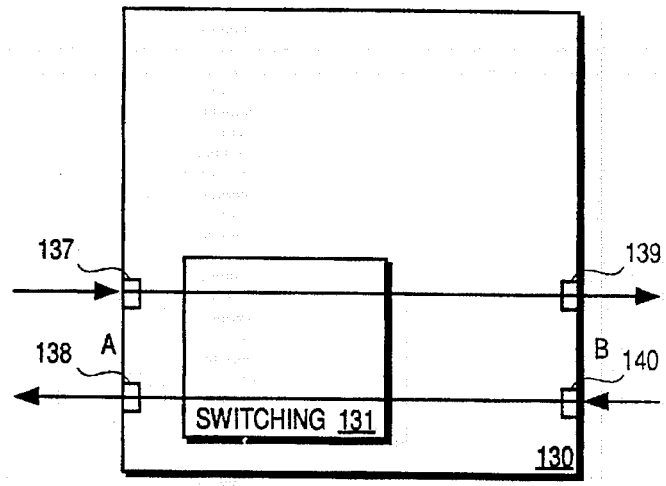
FIGS. 6A through 6C illustrate some acceptable data paths within a digital media link (DML) during normal operation of the system according to the currently preferred embodiment.
Figure 6B:
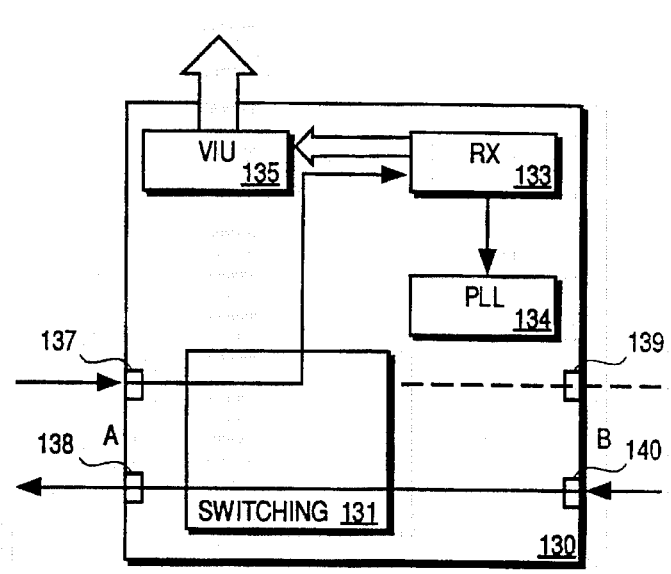
Figure 6C:
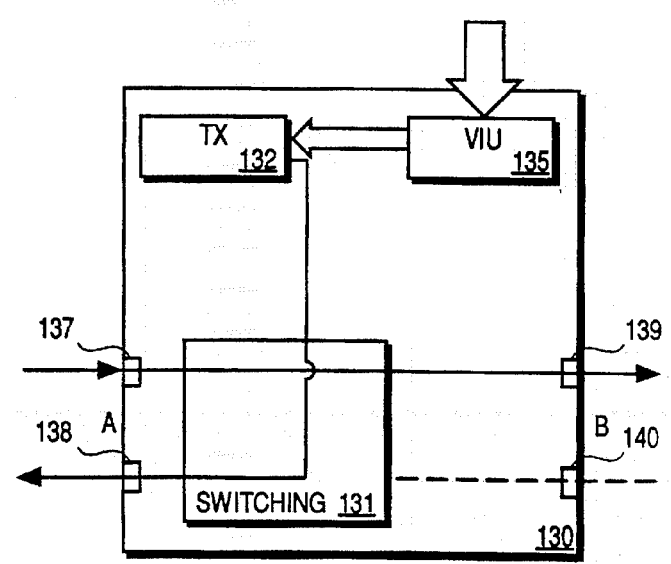

While the present invention is concerned with the initialization and topological identification of the system, it should also be noted that various data transfer modes other than those depicted in FIGS. 4A-4E might be used during normal operation of the system. Some of these configurations are depicted in FIGS. 6A, 6B, and 6C. FIG. 6A corresponds to a configuration where video data is simply passed through the DML 130. Specifically, data received on channel A via receive port A 137 is routed directly to transmit port B 139 where it is retransmitted onto channel B. Video data received on channel B via receice port B 140 is routed directly to transmit port A 138, where it is retransmitted onto channel A. Referring to FIG. 6B, video data received on channel B is directly retransmitted onto channel A, whereas video data received on channel A is routed to the receiver 133 and to the PLL 134. The video data is then converted to parallel format in the receiver 133 and routed to the VIU 135 and to other circuitry within the video device 230-234. Referring to FIG. 6C, video data received on channel A is routed directly to transmit port B 139, where it is transmitted onto channel B. Parallel video data which is to be transmitted from the video device 230-234, such as data acquired by video camera, is input into the VIU 135, where it is routed to the transmitter 132 and then out through transmit port A. It will be apparent to one skilled in the art that other data transfer mode configurations are possible during system operation.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of initializing and determining the topological configuration of a system for processing video information, the system having a master device and a plurality of slave devices for transmitting or receiving the video information coupled in a daisy chain by a video link, the method comprising the steps of:
    (a) using the master device to transmit video data onto the video link;
    (b) using the master device to issue commands to the slave devices to control the routing of the transmitted video data within the slave devices;
    (c) assigning a unique address to each of the slave devices based on responses of the slave devices to the commands and the transmitted video data; and
    (d) determining the position in the daisy chain of each of the slave devices based on the responses of the slave devices to the commands and the transmitted video data.

2. The method of claim 1, wherein the step of assigning a unique address comprises storing in a memory in each of the slave devices the unique address associated with each slave device.

3. The method of claim 2, wherein the step of assigning a unique address further comprises storing in a memory in the master device the unique address of each slave device and the corresponding position in the daisy chain of the slave device associated with each unique address.

4. The method of claim 1, wherein each of the slave devices comprises a first input for receiving video data from devices more senior in the daisy chain and a first output for transmitting the video data to devices more junior in the daisy chain.

5. The method of claim 4, wherein each of the slave devices further comprises a second input for receiving video data from devices more junior in the daisy chain and a second output for transmitting video data to devices more senior in the daisy chain.

6. The method of claim 5, wherein the determining step comprises the steps of:
 1) using the master device to issue commands to configure any slave device which has been assigned the unique address for inputting at the first input the video data transmitted from the master device and for transmitting at the second output the received video data back to the master device;
 2) transmitting the video data onto the video link from the master device; and
 3) determining whether the master device is receiving from one of the slave devices the video data transmitted from the master device.

7. The method of claim 4, wherein the commands comprise a first command for configuring the slave devices for receiving at the first input and for locking onto the video data transmitted from the master device and for not transmitting the video data to slave devices more junior in the daisy chain.

8. The method of claim 5, wherein the commands comprise a second command for configuring the slave devices for receiving at the first input the video data transmitted from the master device, and for not locking onto the video data transmitted from the master device, and for passing the video data transmitted from the master device through to the first output for transmission to slave devices more junior in the daisy chain.

9. The method of claim 5, wherein each of the slave devices responds to the commands by selecting:
 which of the first input and the second input of the selecting slave device are enabled to receive video data;
 which of the first output and the second output of the selecting slave device are enabled to transmit video data; and
 whether or not received video data is locked onto by the selecting slave device.

10. The method of claim 1, wherein a control bus is used to convey addresses and the commands from the master device to the slave devices.

11. The method of claim 1, wherein the master device is in a computer.

12. The method of claim 1, wherein each of the slave devices comprises a phase-locked loop for locking on to video data.

13. The method of claim 1, wherein each of the slave devices comprises a plurality of serial inputs, a plurality of serial outputs, and a plurality of multiplexors, the multiplexors for selecting the serial inputs and the serial outputs.

14. A method of initializing and determining the topological configuration of a system for processing video information, the system having a master device coupled by a serial video data link in a daisy chain to a plurality of slave devices for transmitting or receiving video data, each of the slave devices having a first input and a second input, the method comprising the steps of:
 (a) assigning a default address to each of the slave devices;
 (b) configuring each of the slave devices which has the default address for receiving at the first input and locking on to video data transmitted from the master device and for not transmitting the received video data to slave devices more junior in the daisy chain;
 (c) transmitting a video data stream from the master device on the data link such that no more than one slave device receives and locks on to the video data;
 (d) assigning a unique address to replace the default address to any slave device which has received and locked on to the video data stream;
 (e) determining whether one of the slave devices has been assigned the unique address;
 (f) if a slave device has been assigned the unique address, determining the relative position in the daisy chain of the slave device which has been assigned the unique address;
 (g) if a slave device has been assigned the unique address, storing the unique address and the relative position in the daisy chain of the slave device which has been assigned the unique address;
 (h) configuring the slave device which has been assigned the unique address for transmitting video data received at the first input to slave devices more junior in the daisy chain without locking on to the video data;
 (i) repeating steps (b) through (h) such that each of the slave devices is assigned a unique address and such that the relative position in the daisy chain and the corresponding unique address for each slave device is stored.

15. The method of claim 14, wherein the step of assigning a default address comprises the steps of:
 1) determining whether unique addresses have previously been assigned to the slave devices; and
 2) assigning the default address to each slave device which previously has been assigned a unique address.

16. The method of claim 14, wherein if a slave device is not assigned the unique address in step (d), step (d) is followed by the steps of:
 1) configuring each of the slave devices which has been assigned the default address for receiving at the second input and locking on to video data transmitted from the master device and for not transmitting the received video data; and
 2) returning to step (c).

17. The method of claim 14, wherein the step of assigning a unique address comprises storing in a memory in each of the slave devices the unique address associated with each slave device.

18. The method of claim 14, wherein the determining step (e) comprises the steps of:
 1) configuring any slave device which has been assigned the unique address for inputting video data transmitted from the master device and for transmitting the received video data back to the master device;
 2) transmitting a video data stream onto the data link from the master device; and
 3) determining whether the master device is receiving from one of the slave devices the data stream transmitted by the master device;
 wherein a slave device is determined to have been assigned the unique address if the master device is receiving the data stream.

19. The method of claim 14 wherein steps (a), (b), (d) and (h) are performed using a control bus coupled to the master device and the slave devices to issue commands from the master device to the slave devices.

20. The method of claim 14, wherein the step of transmitting a video data stream comprises the step of interleaving clock information within the video data stream.

21. The method of claim 14, wherein at least one of the slave devices is an adapter for interfacing the video data link to an analog video device.

22. The method of claim 14, wherein the master device is in a computer.

23. The method of claim 14, wherein at least one of the slave devices is for interfacing the data link with a video camera.

24. A method of initializing and determining the topological configuration of a system for processing video information, the system having a controller coupled by a video data link in a daisy chain to a plurality of video devices for transmitting or receiving video data, the controller and the video devices each having an interface device for interfacing with the video data link, the method comprising the steps of:

(a) assigning a default address to each of the video devices;

(b) configuring each interface device of a video device having the default address for receiving at a first input and locking on to video data transmitted from the controller and for not transmitting the received video data to video devices more junior in the daisy chain;

(c) transmitting a video data stream from the controller on the serial data link such that no more than one interface device receives and locks on to the video data;

(d) assigning a unique address to replace the default address to any video device the interface device of which has received and locked on to the video data stream;

(e) determining whether one of the video devices has been assigned the unique address;

(f) storing in a memory in the controller, if a video device has been assigned the unique address, the unique address and the relative position in the daisy chain of the video device which has been assigned the unique address;

(g) configuring the interface device of the video device having the unique address for transmitting video data received at the input to video devices more junior in the daisy chain without locking on to the video data;

(h) repeating steps (b) through (g) such that each of the video devices is assigned a unique address and such that the relative position in the daisy chain and the corresponding unique address for each video device is stored in the memory.

25. The method of claim 24, wherein at least one of the interface devices is an integral component of the video device with which the interface device is associated.

26. The method of claim 24, wherein at least one of the interface devices is an adapter which is removably connectable to one of the video devices.

27. The method of claim 24, wherein at least one of the interface devices is an adapter for interfacing the video data link to an analog video device.

28. The method of claim 27, wherein the analog video device is compatible with National Television System Committee (NTSC) format.

29. The method of claim 27, wherein the analog video device is compatible with Phase Alternating Line (PAL) format.

30. The method of claim 24, wherein at least one of the interface devices is an adapter for interfacing the video data link to a video device which is compatible with Society of Motion Picture and Television Engineers (SMPTE) format.

31. The method of claim 24, wherein the controller is a computer.

32. A control device capable of being coupled to a plurality of interface devices by a daisy chain video data link, each of the interface devices for coupling one of a plurality of video devices to the daisy chain video data link, the control device comprising:

(1) a memory; and (2) a processor coupled to each of the interface devices by a control bus and coupled to the memory, wherein the processor is configured to:

(a) cause video data to be transmitted on the daisy chain video data link to the video devices from the control device;

(b) cause a plurality of commands and addresses to be transmitted to the video devices, the commands for causing selection of the routing of the transmitted video data within each of the interface devices;

(c) assign a unique address to each of the video devices based on responses of the interface devices to the commands and to the video data transmitted on the daisy chain video data link from the control device;

(d) determine the relative position in the daisy chain and the corresponding unique address of each of the video devices based on responses of the interface devices to the commands and to the video data transmitted on the daisy chain video data link from the control device; and (e) store in the memory the relative position in the daisy chain and the corresponding unique address of each of the video devices.

33. The apparatus of claim 32, wherein each of the interface devices comprises a first input for receiving the video data and a first output for transmitting the video data.

34. The apparatus of claim 33, wherein the commands are further for causing the interfaces devices to be configured for receiving at the first input video data transmitted on the daisy chain video data link from the control device and for locking on to the received video data and for not transmitting the received video data.

35. The apparatus of claim 34, wherein the commands are further for configuring a predetermined one of the interface devices for receiving at the first input video data transmitted on the daisy chain video data link by the control device and for passing the received video data through to the first output of the predetermined interface device without locking on to the received video data.

36. The apparatus of claim 35, wherein each of the interface devices further comprises a second input for inputting serial video data and a second output for transmitting serial video data.

37. The apparatus of claim 36, wherein the commands are for causing the interface devices to select:

which of the first input and the second input are enabled;

which of the first output and the second output are enabled; and whether input serial video data is passed directly through to one of the first output and the second output.

38. The apparatus of claim 32, wherein the control device is a computer.

39. The apparatus of claim 36, wherein each of the first inputs, the first outputs, the second inputs, and the second outputs are compatible with high-speed serial data.

40. The apparatus of claim 32, wherein the video data is interleaved with imbedded clock data.

41. An apparatus for processing video data, comprising:

(a) a plurality of means for transmitting or receiving video data, each of the means for transmitting or receiving having an interface means for coupling the means for transmitting or receiving to a video data link; and (b) control means coupled to each of the interface means in a daisy chain by the data link, the control means for selecting the routing of video data between the means for transmitting or receiving, the control means having:
  (1) storage means for storing a plurality of addresses; and
  (2) processor means for causing a plurality of commands, video data, and the addresses to be transmitted to the means for transmitting or receiving from the control means, the commands for causing each of the interface means to select the routing of the transmitted video data within each of the interface means, wherein the processor means is further for assigning a unique address to each of the means for transmitting or receiving and for determining and storing in the storage means the relative position in the daisy chain and the corresponding unique address of each of the means for transmitting or receiving based on responses of the interface means to the commands and to the video data transmitted from the control means.

* * * * *